United States Patent [19]

Sabot et al.

[11] Patent Number: 4,461,748
[45] Date of Patent: Jul. 24, 1984

[54] LIQUID-LIQUID EXTRACTION OF RARE EARTH/URANIUM/THORIUM VALUES

[75] Inventors: Jean-Louis Sabot, Maisons Laffitte; Alain Leveque, Paris, both of France

[73] Assignee: Rhone-Poulenc Specialites Chimiques, Courbevoie, France

[21] Appl. No.: 436,353

[22] Filed: Oct. 25, 1982

[30] Foreign Application Priority Data

Oct. 30, 1981 [FR] France ................................. 81 20385

[51] Int. Cl.³ ...................... C01G 43/00; C01F 17/00; C01F 15/00
[52] U.S. Cl. ..................................... 423/10; 423/21.5; 423/139; 423/20
[58] Field of Search .................. 423/10, 21.5, 139, 20

[56] References Cited

U.S. PATENT DOCUMENTS

| 2,815,264 | 12/1957 | Calkins et al. | 423/10 |
| 2,848,300 | 8/1958 | Warf | 423/10 |
| 2,883,264 | 4/1959 | Warf | 423/10 |
| 2,943,923 | 7/1960 | Morgan | 423/10 |
| 3,013,859 | 12/1961 | Kuhlman, Jr. et al. | 423/21.5 |
| 3,745,205 | 7/1973 | Peppard et al. | 423/10 |
| 3,804,940 | 4/1974 | Mason et al. | 423/10 |
| 3,835,213 | 9/1974 | Ritcey et al. | 423/10 X |
| 3,959,435 | 5/1976 | Mills et al. | 423/10 |

FOREIGN PATENT DOCUMENTS 50-28500 3/1975 Japan ..................................... 423/10

OTHER PUBLICATIONS

Jamrack, W. D. *Rare Metal Extraction by Chemical Engineering Techniques* Pergamon Press/MacMillan Co., N.Y., 1963, pp. 176-180.
Clegg, J. W. and D. D. Foley *Uranium Ore Processing* Addison-Wesley, Mass., 1958, pp. 242-244.

Primary Examiner—Deborah L. Kyle
Assistant Examiner—Matthew A. Thexton
Attorney, Agent, or Firm—Burns, Doane, Swecker & Mathis

[57] ABSTRACT

Rare earth, uranium and thorium values are separated and recovered from aqueous solutions of the chlorides thereof, said aqueous solutions having an acidity of less than 2 N and a concentration in such values, expressed as the oxides thereof, of at least 50 g/l, by liquid-liquid extracting said aqueous solutions with an organic extractant comprising at least one neutral organophosphorus compound.

31 Claims, 3 Drawing Figures

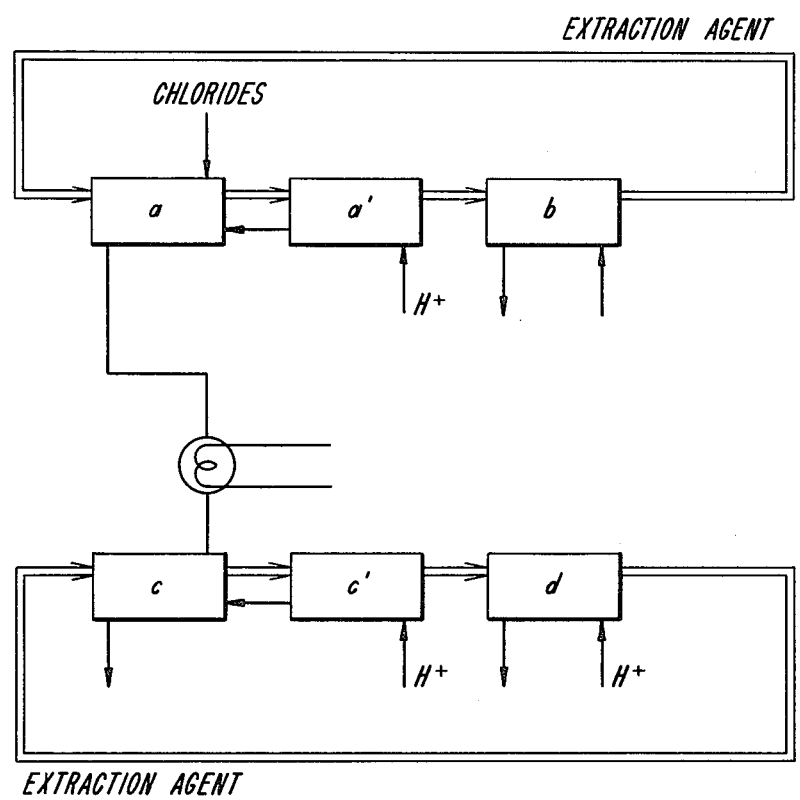

LIQUID-LIQUID EXTRACTION OF RARE EARTH/URANIUM/THORIUM VALUES

BACKGROUND OF THE INVENTION

1. Field of the Invention

The present invention relates to the extraction and separation of uranium, thorium and rare earth values, and, more especially, to the extraction/separation of such values by certain treatment of aqueous solutions of the chlorides thereof.

2. Description of the Prior Art

It is known that uranium, thorium and rare earths are present in the natural state in ores such as monazite, bastnaesite and xenotime. Such values are also found in various extraction solutions, which are subjected to prior concentration. In order to recover some of these elements, the ores are subjected, after grinding, to alkaline attack by sodium hydroxide in an autoclave. The uranium, thorium and rare earth hydroxides formed precipitate, while the soluble phosphates are removed.

The hydroxides formed also include various metal hydroxides deriving from the metals contained in the starting material ores, such as iron, titanium and calcium.

The uranium, thorium and rare earth hydroxides and, if appropriate, the various other metal hydroxides are solubilized by means of a strong acid, such as nitric acid or hydrochloric acid.

One technique for separating the uranium, thorium and the various rare earth values consists of carrying out successive liquid-liquid extraction operations beginning with aqueous solutions of the salts of said elements.

The uranium, the thorium and also the various rare earth values which have been separated cannot, however, be used in certain applications unless they contain only a very small level of impurities and of radioactivity.

It too is known to isolate uranium, thorium and rare earths from niric acid solutions [Menzies and Rigby, *J. Appln. Chem.*, "Solvent Extraction of Thorium" (Mar. 11, 1961)].

And it is also known, from *Ekstraktsiya-Theoriya, Primenemie, Apparatura, Sb. Statei*, No. 2, 160-4 (1962), to extract thorium from hydrochloric acid solutions by means of an organic extractant consisting of diisoamyl methylphosphonate diluted in an organic solvent.

The authors of the immediately aforesaid article indicate that the extraction coefficient of the thorium increases with the hydrochloric acid concentration and decreases with increasing thorium concentration.

This conclusion is confirmed in an article published in the journal *Fresenius' Z. Anal. Chem.*, 238, 4 (1968), in which the authors extract and separate thorium and cerium from hydrochloric acid solutions by means of a neutral organophosphorus extractant consisting of tributyl phosphate or diisoamyl methylphosphonate in solution in an organic diluent, namely, xylene. The authors studied the variation in the respective extraction coefficients of the cerium and thorium as a function of the variation in the hydrochloric acid concentration. They conclude from this study that, to obtain a proper separation of cerium from thorium, the hydrochloric acid concentration in the aqueous starting solution must be at least 6 N.

It is thus apparent that, according to these two articles, the extraction and separation of the two elements thorium and cerium from hydrochloric acid solutions can only be carried out as a practical matter in the case where the aqueous solutions have a high acidity and a low concentration of the elements to be extracted.

Now, the solutions originating from the attack of the ores by sodium hydroxide, followed by the dissolution of the oxides with hydrochloric acid, are neutral or very weakly acidic solutions (hydrochloric acid concentrations generally less than about 2 N) possessing a high concentration of the elements to be separated (uranium, thorium and rare earths).

The extraction of neutral or very weakly acidic solutions possessing a high concentration of the elements to be separated (uranium, thorium and rare earths), with a view to obtaining each of these elements in the purest possible state at the lowest cost, is an industrial problem. In fact, uranium, thorium or rare earths cannot be used in certain applications unless they have a very low level of impurities.

SUMMARY OF THE INVENTION

Accordingly, a major object of the present invention is the provision of an improved process for the extraction and separation of uranium, thorium, rare earth and, if appropriate, iron values by liquid-liquid extraction of an aqueous phase containing the salts of the foregoing metals with an organic extractant, and in accordance with which improved process an aqueous solution of the chlorides of uranium, thorium, rare earths and, if appropriate, iron, containing at least 30% by weight of rare earths and having an acidity of less than 2 N and a total concentration, expressed as the oxides thereof (uranium, thorium and rare earths), of at least 50 g/l, is extracted with an organic extractant phase containing an extractant which comprises at least one neutral organophosphorus compound, if appropriate in solution in suitable diluent.

BRIEF DESCRIPTION OF THE DRAWINGS

FIG. 3 is a schematic diagram of yet another countercurrent liquid-liquid extraction/regeneration/recovery apparatus also suitable for carrying out the process according to the invention.

DETAILED DESCRIPTION OF THE INVENTION

Figure 1:
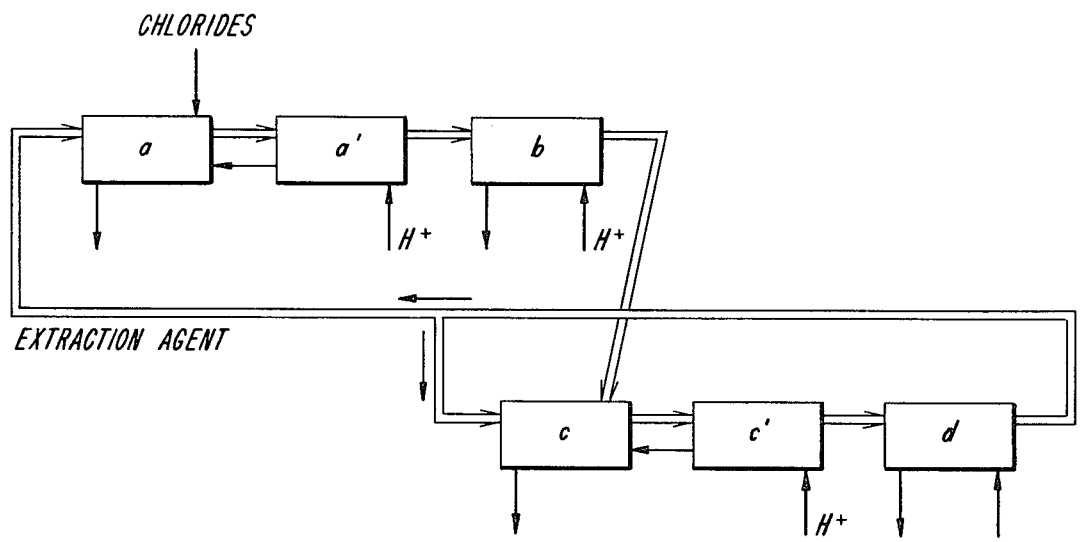
FIG. 1 is a schematic diagram of one countercurrent liquid-liquid extraction/regeneration/recovery apparatus suitable for carrying out the process according to the invention.

More particularly according to the present invention, the subject process is admirably well suited to economical industrial application providing highly pure final products at a cost well below that of the products obtained per the prior art techniques.

The starting material solutions to be treated consistent herewith, originating from the redissolution with hydrochloric acid of the oxides obtained as a result of the alkaline attack of the various ores, comprise uranium, thorium and rare earth chlorides, but they frequently also contain the chlorides of various other elements, such as iron.

The iron, an element which is frequently present in considerable amounts depending upon the starting ores, must be removed in certain instances.

If the iron represents more than 5% by weight of the amount of uranium, it must be removed in order to provide uranium solutions which are sufficiently pure for industrial application. This iron removal constitutes another embodiment of the process of the invention.

According to this invention, the concentration by weight of the rare earth oxides in the aqueous starting solution must range from 30 to 100%, the concentration of thorium oxide must range from 0 to 30% and the concentration of uranium oxide must range from 0 to 70%.

If, according to the invention, the aqueous solution of chlorides contains trace amounts of thorium (less than 1% by weight), the concentration of the rare earth oxides must be at least 30%.

If the aqueous solution is "poor" in thorium values and contains less than 5% of thorium oxide, it is preferable to employ a solution containing a concentration in rare earth oxides of at least 40% by weight.

If the aqueous solution is "rich" in thorium values and contains from 5 to 30% of thorium oxide, it is particularly advantageous to employ a solution containing a concentration of rare earth oxides of at least 50% by weight and more particularly of at least 70%.

The subject liquid-liquid extraction is especially well suited for the extraction of aqueous solutions of uranium, thorium and rare earth chlorides containing at least 30% by weight of rare earths and having an acidity which is less than or equal to 2 N, and preferably less than or equal to 1 N, and a total concentration, expressed as total oxides, ranging from 50 g/l to 600 g/l.

The extraction is carried out with a neutral, substantially water-insoluble organophosphorus extractant selected from among the following four major classes:

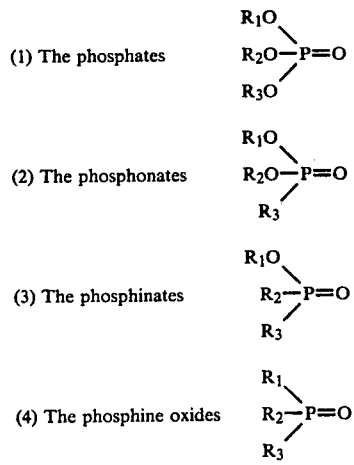

in which $R_1$, $R_2$ and $R_3$ represent aromatic and/or aliphatic hydrocarbon radicals having from 1 to 18 carbon atoms, and in which at least one group R contains from 4 to 15 carbon atoms.

From among such compounds, those which are preferred are those which are industrially available, such as tri-n-butyl phosphate (TBP), triisobutyl phosphate (TIBP), dibutyl butylphosphonate (DBBP), di-2-ethylhexyl 2-ethylhexylphosphonate (DEHEHP) and trioctylphosphine oxide (TOPO).

Such extractants can either be used in the pure state, or in solution in suitable diluent.

The diluents which can be used are those normally used for performing liquid-liquid extraction operations. Among these, representative are aliphatic compounds such as, for example, hexane, heptane, dodecane and petroleum cuts of the kerosene type; aromatic compounds, such as, for example, benzene, toluene, ethylbenzene, xylene and cuts of the Solvesso type (registered trademark of Exxon); and, finally, halogen derivatives, such as, for example, chloroform and carbon tetrachloride.

The concentrations of the organophosphorus extractants can vary over wide limits depending upon the nature of the particular extractant.

The concentrations can vary from 5% by volume in the case where the extractant is in solution in a diluent, up to about 100% in the case where the extractant is used pure.

The order in which the extractions become easier and the required concentration of organophosphorus extractant becomes less is as follows: phosphates, phosphonates, phosphinates and phosphine oxides.

The extractants can be employed either alone or in admixtures thereof.

The neutral organophosphorus compounds can be combined or admixed in any proportions. For each of the mixtures of organophosphorus compounds, the extraction coefficients and extraction capacities obtained for a given element to be extracted are between those obtained with each of the components of the mixture used by itself.

Thus, for each of the elements to be extracted (uranium, thorium or rare earths), it is possible to formulate a mixture of extractants which makes it possible to separate one element from the others.

It is thus apparent that, depending on the choice and concentration of the extractant or extractants, it is possible to separate one element from the other two with extremely low levels of impurities.

In one embodiment of the invention, where it is desired to separate uranium, thorium and rare earths from a hydrochloric acid solution of these elements, a mixture of extractants can be selected which makes it possible, in a first step, to extract the uranium into organic solution while maintaining the thorium and the rare earths in aqueous solution, these latter two elements being separated in a subsequent step either with the aid of the same mixture of extractants, but used at a different concentration, or with the aid of one or more different extractants.

If it is desired to extract rare earths from a solution containing thorium (the uranium having been removed beforehand) or from a solution containing thorium and uranium and, if appropriate, iron, it is preferred to use at least one extractant selected from among the following classes: phosphonates, phosphinates and phosphine oxides. These extractants can then be used by themselves, mixed with one another or mixed with the phosphate class.

The concentration of elements to be extracted, namely, uranium, thorium and rare earths, also plays an important role in the extraction mechanisms.

The industrial-scale extraction of the various elements (uranium, thorium and rare earths) becomes progressively easier as the number of carbon-phosphorus bonds increases or, respectively, as the polarity of the phosphoryl group, PO, of the extractant increases.

Thus, industrial-scale separation with the extractants containing the smallest number of carbon-phosphorus bonds, such as the phosphates, can only be carried out for total concentrations, expressed as the oxides of the elements to be extracted (uranium, thorium and rare earths), of at least 250 g/l, whereas, with extractants comprising a phosphoryl group of much higher polarity, such as the phosphine oxides, the minimum concentration required is 50 g/l.

According to the invention, it is advantageous to employ two particular embodiments.

In a first particular embodiment, it is envisaged to extract and separate uranium, thorium and rare earths by liquid-liquid extraction of an aqueous phase containing the salts of such metals with an organic extractant phase containing a neutral organophosphorus compound by the following procedure:

(i) In a first step, in order to recover the rare earths, the aqueous solution of uranium, thorium and rare earth chlorides, containing at least 30% by weight of rare earths and having an acidity of less than 2 N and a concentration, expressed as total oxides, of more than 50 g/l, is contacted with an organic solution comprising a diluent and an extractant, such as to extract the uranium and thorium chlorides into the organic phase and to leave the rare earth chlorides in the aqueous phase;

(ii) In a second step, in order to recover the thorium, the organic phase resulting from the first step is contacted with water or a dilute hydrochloric acid solution, such as to extract the thorium into aqueous solution and to leave the uranium in organic solution; and (iii) In a third step, in order to recover the uranium, the organic phase resulting from the second step is contacted with water or an aqueous solution of an alkali metal carbonate, such as to extract the uranium into aqueous solution.

If the starting material ore contains an excessively large amount of iron, a variation of the aforesaid first particular embodiment can be employed.

The organic phase resulting from the first step, containing the uranium, the thorium and the iron, is washed with a nitric acid solution having a concentration of between 1 and 4 N, in order to remove the iron in the form of ferric nitrate.

The second step, for recovering the thorium, is carried out starting from the organic phase freed of the iron, which is contacted with a dilute nitric acid solution in order to recover the thorium in aqueous solution.

The following steps are carried out in accordance with the first embodiment described above.

More particularly, it can be advantageous to utilize the following:

(iia) In the second step, water or hydrochloric acid having a concentration which is less than or equal to 0.1 M; and (iiia) In the third step, an aqueous solution of an alkali metal carbonate having a concentration ranging from 0.5 to 2 M.

According to the noted second particular embodiment, it is possible to extract and separate uranium, thorium and rare earths by liquid-liquid extraction of an aqueous phase containing the salts of these metals with an organic phase containing a neutral organophosphorus compound, by the following procedure:

(i) In a first step, in order to separate the rare earths and thorium on the one hand and the uranium on the other hand, the aqueous solution of uranium, thorium and rare earth chlorides, containing at least 30% of rare earth oxides and having an acidity of less than 2 N and a concentration, expressed as total oxides, of at least 50 g/l, is contacted with an organic solution comprising a diluent and an extractant, such as to extract the uranium chlorides into the organic phase and to leave the thorium and rare earth chlorides in the aqueous phase;

(ii) In a second step, in order to recover the uranium, the organic phase resulting from the first step is contacted with water or a solution of an alkali metal carbonate, such as to extract the uranium into aqueous solution;

(iii) In a third step, in order to recover the rare earths, the aqueous phase resulting from the first step, containing the thorium and the rare earths, is contacted with an organic solution comprising a diluent and an extractant, such as to extract the thorium into the organic phase and to leave the rare earths in the aqueous phase; and (iv) In a fourth step, in order to recover the thorium, the organic phase resulting from the third step is contacted with water or with a hydrochloric acid solution such as to extract the thorium into aqueous solution.

If the starting material ore contains an excessively large amount of iron, a variation of the aforesaid second particular embodiment can be employed. The organic phase resulting from the first step, containing the uranium and the iron, is washed with a nitric acid solution having a concentration of between 1 and 4 N, in order to remove the iron in the form of ferric nitrate.

The following steps are carried out in accordance with the second embodiment described above.

More particularly, it can be advantageous to utilize the following:

(iib) In the second step, a solution of an alkali metal carbonate having a concentration ranging from 0.5 to 2 M; and (ivb) In the fourth step, water or a hydrochloric acid solution having a concentration of less than 0.1 M.

The various contacting and washing steps can be carried out in conventional liquid-liquid extraction devices operating countercurrently. Such devices typically comprise several stages of mixing-decanting systems or of packed and/or agitated columns, appropriately arranged for carrying out operations of extraction, selective washing and recovery of the elements in the aqueous phase, and of regeneration of the extraction agent.

The various steps are carried out in accordance with conventional operating conditions used in liquid-liquid extraction, and the operating temperatures are usually between ambient temperature and 80° C., preferably between ambient temperature and 70° C.

The respective flow rates of the organic and aqueous phases which are to be present result from the combination of different parameters according to calculations which are well known to those skilled in the art.

In order to further illustrate the present invention and the advantages thereof, the following specific examples are given, it being understood that same are intended only as illustrative and in nowise limitative.

EXAMPLE 1

The procedure of this example was carried out as a first embodiment of the invention, in the apparatus shown in FIG. 1 of the drawings, which comprised:

(1) A first set of liquid-liquid extraction units operating countercurrently, consisting of an extraction section (a) containing 6 theoretical stages and of a washing section (a') containing 8 theoretical stages;

(2) A regeneration-recovery section (b) containing 4 theoretical stages;

(3) A second set of liquid-liquid extraction units operating countercurrently, consisting of an extraction section (c) containing 6 theoretical stages and of a washing section (c') containing 6 theoretical stages; and (4) A regeneration-recovery section (d) containing 2 theoretical stages.

The starting material hydrochloric acid solution had an acidity of 0.5 N and a concentration of total oxides of 340 g/l, and was constituted as follows:

| (I) | Rare earth oxides | 310 g/l (namely, 91%) |
|---|---|---|
| (II) | Thorium oxide | 30 g/l (namely, 9%) |
| (III) | Uranium oxide | 1 g/l |
| (IV) | Iron oxide | 1 g/l |

The inlets and outlets of the extraction units and regeneration-recovery units were defined according to the direction of flow of the organic phase.

In a first step:

(i) The solution of chlorides was introduced into the outlet of the extraction unit (a) at a rate of flow of 130 l/hour; a solution composed of a mixture of 75% by weight of dibutyl butylphosphonate and 4% by weight of trioctylphosphine oxide in kerosene was introduced into the inlet of the same extraction unit (a) at a rate of flow of 78 l/hour;

(ii) A molar solution of hydrochloric acid was introduced into the washing unit (a') at a rate of flow of 13 l/hour;

(iii) An aqueous solution containing 282 g/l of rare earth oxides, which corresponded to an extraction yield of more than 99.9%, less than 1 mg/l of uranium oxide and less than 5 mg/l of thorium oxide was collected at the inlet of the extraction unit (a) (the limits of detection of the analytical instruments made it impossible to determine a lower limit in the determination of the uranium and thorium);

(iv) The organic solution of dibutyl butylphosphonate and trioctylphosphine oxide emanating from the washing section (a') was introduced into the regeneration-recovery section (b), still at the same flow rate (78 l/hour), countercurrently with a 2 M nitric acid solution introduced at a rate of flow of 65 l/hour; and (v) An aqueous solution containing 2 g/l of iron and containing less than 1 mg/l of uranium was collected at the inlet of the regeneration-recovery section (b).

In a second step:

(i') The organic solution emanating from the regeneration-recovery section (b) was introduced, still with a constant flow rate of 78 l/hour, into the extraction section (c) of the second set of units. A solution of dibutyl butylphosphonate and trioctylphosphine oxide, having the same composition as the previous solution and emanating from the outlet of the regeneration-recovery section (d), was introduced into this same extraction section (c) at a rate of flow of 26 l/hour. An 0.1 M nitric acid solution was introduced into the washing section (c') of the same set of units at a rate of flow of 130 l/hour; and (ii') An aqueous solution of thorium oxide having a concentration of 30 g/l and containing less than 1 mg/l of uranium and less than 1 mg/l of rare earth oxides was collected at the inlet of the extraction section (c).

In a third step:

(i'') The organic solution emanating from the washing section (c') was introduced into the regeneration-recovery section (d) at a rate of 104 l/hour. A molar sodium carbonate solution was introduced into this same unit, countercurrently, at a rate of flow of 26 l/hour;

(ii'') An aqueous solution of uranium having a concentration of 5 g/l and containing less than 5 mg/l of thorium oxide was collected at the inlet of the regeneration-recovery section (d); and (iii'') The organic solution resulting from this regeneration-recovery unit was partially recycled into section (a) of the first set of units at a rate of flow of 78 l/hour, and partially recycled into section (c) of the second set of units at a rate of flow of 26 l/hour.

EXAMPLE 2

Figure 2:
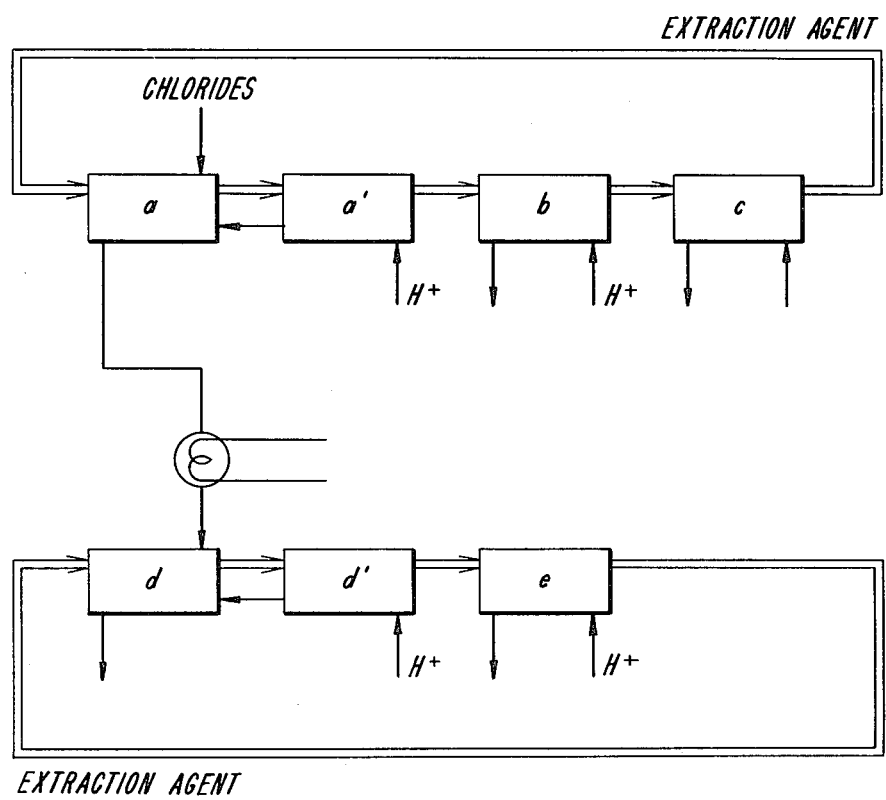
FIG. 2 is a schematic diagram of another countercurrent liquid-liquid extraction/regeneration/recovery apparatus also suitable for carrying out the process according to the invention.

The procedure of this example was carried out as a second embodiment of the invention, in the apparatus shown in FIG. 2 of the Drawings, which comprised:

(1) A first set of liquid-liquid extraction units operating countercurrently, consisting of an extraction section (a) containing 4 theoretical stages, and of a washing section (a') containing 5 theoretical stages;

(2) A first regeneration-recovery section (b) containing 4 theoretical stages;

(3) A second regeneration-recovery section (c) containing 2 theoretical stages;

(4) An evaporator for concentrating the aqueous solution resulting from (a);

(5) A second set of extraction units consisting of an extraction section (d) containing 6 theoretical stages and of a washing section (d') containing 8 theoretical stages; and (6) A third regeneration-recovery section (e) containing 6 theoretical stages.

The solution of the chlorides of the elements to be extracted had an acidity of 0.5 N and a concentration of total oxides of 250 g/l, and was constituted as follows:

| (I) | Rare earth oxides | 225 g/l (namely, 90%) |
|---|---|---|
| (II) | Thorium oxide | 25 g/l (namely, 10%) |
| (III) | Uranium oxide | 1 g/l |
| (IV) | Iron oxide | 1 g/l |

In a first step:

(i) The solution of chlorides was introduced into the outlet of the extraction unit (a) at a rate of flow of 320 l/hour; a solution of 55% by weight of dibutyl butylphosphonate in kerosene was introduced into the inlet of (a) at a rate of flow of 64 l/hour;

(ii) An 0.05 M hydrochloric acid solution was introduced into the washing unit (a') at a rate of flow of 16 l/hour;

(iii) An aqueous solution containing the thorium and the rare earths and having a concentration of 240 g/l was collected at the inlet of the extraction unit (a), and this solution was concentrated to 310 g/l;

(iv) The organic solution of dibutyl butylphosphonate in kerosene, originating from the washing unit (a'), was introduced into the regeneration-recovery unit (b) countercurrently with a 2 M nitric acid solution introduced at a rate of flow of 32 l/hour; and (v) A nitric acid solution containing 10 g/l of iron and containing less than 1 mg/l of uranium was collected at the inlet of the unit (b).

In a second step:

(i') The organic solution emanating from the regeneration-recovery section (b) was introduced, still at the same flow rate (64 l/hour), into the regeneration-recovery section (c) countercurrently with a molar aqueous sodium carbonate solution introduced at a rate of flow of 64 l/hour;

(ii') An aqueous solution containing 5 g/l of uranyl carbonate and containing less than 5 mg/l of thorium was collected at the inlet of the regeneration-recovery section (c); and (iii') The organic solution of dibutyl butylphosphonate emanating from the regeneration-recovery section (c) was recycled, still at the same flow rate, into the extraction section (a).

In a third step:

(i'') The aqueous solution of thorium and rare earths which had been concentrated was introduced into the outlet of the extraction unit (d) at a rate of flow of 224 l/hour countercurrently with a solution of a mixture of 75% by weight of dibutyl butylphosphonate and 4% by weight of trioctylphosphine oxide in kerosene, which was introduced at a rate of flow of 128 l/hour;

(ii'') A molar hydrochloric acid solution was introduced into the washing unit (d') at a rate of flow of 13 l/hour; and (iii'') An aqueous solution containing 292 g/l of rare earth oxides (which corresponded to a yield of 99.9%) and containing less than 1 mg/l of uranium and less than 3 mg/l of thorium was collected at the inlet of the extraction unit (d).

In a fourth step:

(i''') The organic solution resulting from the washing unit (d') was introduced into the regeneration-recovery unit (e) countercurrently with an 0.2 M hydrochloric acid solution introduced at a rate of flow of 112 l/hour;

(ii''') An aqueous solution containing 60 g/l of thorium oxide, less than 1 mg/l of uranium and less than 1 mg/l of rare earths was collected at the inlet of the regeneration-recovery unit (e);

(iii''') The organic solution of dibutyl butylphosphonate and trioctylphosphine oxide emanating from the regeneration-recovery section (e) was recycled, still at the same flow rate, into the extraction section (d).

EXAMPLE 3

The procedure of this example was carried out, also as a second embodiment of the invention, in the apparatus shown in FIG. 3 of the drawings, which comprised:

(1) A first set of liquid-liquid extraction units operating countercurrently, consisting of an extraction section (a) containing 5 theoretical stages and of a washing section (a') containing 4 theoretical stages;

(2) A regeneration-recovery section (b) containing 4 theoretical stages;

(3) An evaporator for concentrating the aqueous solution resulting from (a);

(4) A second set of extraction units consisting of an extraction section (c) containing 6 theoretical stages and of a washing section (c') containing 6 theoretical stages; and (5) A regeneration-recovery section (d) containing 4 theoretical stages.

The solution of the chlorides to be extracted, obtained by leaching a concentrate of uranium, thorium and rare earths with hydrochloric acid, had an acidity of 0.4 N and a concentration of total oxides of 250 g/l, and was constituted as follows:

| (I) | Rare earth oxides | 225 g/l (namely, 90%) |
|---|---|---|
| (II) | Thorium oxide | 1 g/l (namely, 0.4%) |
| (III) | Uranium oxide | 25 g/l |

In a first step:

(i) The solution of chlorides to be separated was introduced into the outlet of the extraction unit (a) at a rate of flow rate of 500 l/hour; a solution of 50% by weight of tributyl phosphate in kerosene was introduced into the inlet of (a) at a rate of flow of 250 l/hour;

(ii) An 0.1 M hydrochloric acid solution was introduced into the washing unit (a') at a rate of flow of 50 l/hour;

(iii) An aqueous solution containing the thorium and the rare earths and having a concentration of 200 g/l was collected at the inlet of the extraction unit (a), and this solution was concentrated to 350 g/l.

In a second step:

(i') The organic solution of tributyl phosphate in kerosene, emanating from the washing unit (a'), was introduced into the regeneration-recovery unit (b) countercurrently with water introduced at a rate of flow of 250 l/hour;

(ii') An aqueous solution containing 50 g/l of uranium and containing less than 1 mg/l of rare earth oxides was collected at the inlet of the regeneration-recovery section (b); and (iii') The organic solution of tributyl phosphate emanating from the regeneration-recovery section (b) was recycled, still at the same flow rate, into the extraction section (a).

In a third step:

(i'') The aqueous solution of thorium and rare earths which had been concentrated was introduced into the outlet of the extraction unit (c) at a rate of flow of 300 l/hour countercurrently with a solution of a mixture of 75% by weight of dibutyl butylphosphonate and 4% by weight of trioctylphosphine oxide in kerosene, which was introduced at a rate of flow of 350 l/hour;

(ii'') A molar hydrochloric acid solution was introduced into the washing unit (c') at a rate of flow of 25 l/hour; and (iii'') An aqueous solution containing 315 g/l of rare earth oxides and containing less than 3 mg/l of uranium was collected at the inlet of the extraction unit (c).

In a fourth step:

(i''') The organic solution resulting from the washing unit (c') was introduced into the regeneration-recovery unit (d) countercurrently with an 0.2 M hydrochloric acid solution introduced at a rate of flow of 35 l/hour;

(ii''') An aqueous solution containing 17.5 g/l of thorium oxide was collected at the inlet of the regeneration-recovery unit (d); and (iii''') The organic solution of dibutyl butylphosphonate and trioctylphosphine oxide emanating from the regeneration-recovery section (d) was recycled, still at the same flow rate, into the extraction section (c).

EXAMPLE 4

The procedure of this example was carried out, also as a second embodiment of the invention, in the apparatus shown in FIG. 3 of the drawings, which comprised:

(1) A first set of liquid-liquid extraction units operating countercurrently consisting of an extraction section (a) containing 4 theoretical stages and of a washing section (a') containing 4 theoretical stages;

(2) A regeneration-recovery section (b) containing 2 theoretical stages;

(3) An evaporator for concentrating the aqueous solution resulting from (a);

(4) A second set of extraction units consisting of an extraction section (c) containing 6 theoretical stages and of a washing section (c') containing 6 theoretical stages; and (5) A regeneration-recovery section (d) containing 6 theoretical stages.

The solution of the chlorides of the elements to be extracted had an acidity of about 2 N and a concentration of total oxides of 50.5 g/l, and was constituted as follows:

| (I) | Rare earth oxides | 20 g/l (namely, 40%) |
|-----|-------------------|----------------------|
| (II) | Thorium oxide | 0.5 g/l (namely, 1%) |
| (III) | Uranium oxide | 30 g/l (namely, 59%). |

The first two steps of this example were carried out at a temperature of 50° C. and the last two steps were carried out at ambient temperature.

In a first step:

(i) The solution of chlorides to be separated was introduced into the outlet of the extraction unit (a) at a rate of flow of 1,000 l/hour; a solution of 20% by weight of trioctylphosphine oxide in kerosene was introduced into the inlet of (a) at a rate of flow of 1,000 l/hour;

(ii) An 0.05 M hydrochloric acid solution was introduced into the washing unit (a') at a rate of flow of 100 l/hour; and (iii) An aqueous solution containing the thorium and the rare earths and having a concentration of 18 g/l was collected at the inlet of the extraction unit (a), and this solution was concentrated to 370 g/l.

In a second step:

(i') The organic solution of trioctylphosphine oxide in kerosene, emanating from the washing unit (a') was introduced into the regeneration-recovery unit (b) countercurrently with a molar sodium carbonate solution introduced at a rate of flow of 3,000 l/hour;

(ii') An aqueous solution containing 10 g/l of uranyl carbonate was collected at the inlet of the regeneration-recovery section (b); and (iii') The organic solution of trioctylphosphine oxide emanating from the regeneration-recovery section (b) was recycled, still at the same flow rate, into the extraction section (a).

In a third step:

(i'') The aqueous solution of thorium and rate earths which had been concentrated was introduced into the outlet of the extraction unit (c) at a rate of flow of 50 l/hour counter-currently with a solution of a mixture of 75% by weight of dibutyl butylphosphonate and 4% by weight of trioctylphosphine oxide in kerosene, which was introduced at a rate of flow of 50 l/hour;

(ii'') A molar hydrochloric acid solution was introduced into the washing unit (c') at a rate of flow of 5 l/hour; and (iii'') An aqueous solution containing 330 g/l of rare earth oxides (which corresponded to an extraction yield of 99.9%) was collected at the inlet of the extraction unit (c).

In a fourth step:

(i''') The organic solution resulting from the washing unit (c') was introduced into the regeneration-recovery unit (d) countercurrently with an 0.2 M hydrochloric acid solution;

(ii''') An aqueous solution containing 25 g/l of thorium oxide was collected at the inlet of the regeneration-recovery unit (d); and (iii''') The organic solution of dibutyl butylphosphonate and trioctylphosphine oxide emanating from the regeneration-recovery section (d) was recycled, still at the same flow rate, into the extraction section (c).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the separation and recovery of rare earth, uranium and thorium values from an aqueous solution of the chlorides thereof, said aqueous solution having an acidity of less than 2 N and a concentration in such values, expressed as the oxides thereof, of at least 50 g/l, comprising liquid-liquid extracting said aqueous solution with an organic extractant comprising at least one neutral organophosphorus compound, said at least one neutral organophosphorus compound being a phosphonate, phosphinate, or phosphine oxide when thorium is extracted by said organic extractant, and said at least one neutral organophosphorus compound being a phosphate, phosphonate, phosphinate or phosphine oxide when thorium is to remain in aqueous solution.

2. The process as defined in claim 1, the concentrations of such values in said starting aqueous solution, expressed as the oxides thereof, ranging from 30 to 100% for the rare earths, from 0 to 30% for the thorium, and from 0 to 70% for the uranium.

3. The process as defined by claim 2, further comprising the additional separation and recovery of iron values, said starting aqueous solution also including iron values.

4. The process as defined in claim 2, the concentrations of thorium and uranium values in said starting aqueous solution being greater than 0%.

5. The process as defined by claim 2, said starting aqueous solution having an acidity of less than 1 N.

6. The process as defined by claim 3, said starting aqueous solution having an acidity of less than 1 N.

7. The process as defined by claim 4, said starting aqueous solution having an acidity of less than 1 N.

8. The process as defined by claim 2, the concentration of such values in said starting aqueous solution, expressed as the oxides thereof, ranging from 50 g/l to 600 g/l.

9. The process as defined by claim 2, said at least one neutral organophosphorus compound having at least one of the formulae:

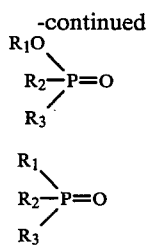

in which $R_1$, $R_2$ and $R_3$ are each an aromatic or aliphatic hydrocarbon having from 1 to 18 carbon atoms, at least one of said groups R having at least 4 carbon atoms.

10. The process as defined by claim 9, at least one of said groups R having from 4 to 15 carbon atoms.

11. The process as defined by claim 9, said at least one neutral organophosphorus compound having at least one of the formulae (II), (III) or (IV).

12. The process as defined by claim 9, said at least one neutral organophosphorus compound comprising tri-n-butyl phosphate (TBP), triisobutyl phosphate (TIBP), dibutyl butylphosphonate (DBBP), di-2-ethylhexyl 2-ethylhexylphosphonate (DEHEHP) or trioctylphosphine oxide.

13. The process as defined by claim 2, said organic extractant comprising a solution of at least one neutral organophosphorus compound in an inert diluent.

14. The process as defined by claim 13, said diluent comprising an aliphatic hydrocarbon, a petroleum cut of Solvesso or kerosene type, an aromatic hydrocarbon or an aliphatic halohydrocarbon.

15. The process as defined by claim 14, said organic extractant comprising at least 5% by volume of said at least one neutral organophosphorus compound.

16. The process as defined by claim 4, comprising (i) first liquid-liquid extracting said starting aqueous solution with said organic extractant, whereby the uranium and thorium chloride values are extracted into an organic phase and the rare earth chloride values remain in a first aqueous phase; (ii) next liquid-liquid extracting the organic phase (i) with water or an aqueous hydrochloric acid solution, whereby the thorium chloride values are extracted into a second aqueous phase and the uranium chloride values remain in the organic phase; and (iii) thence liquid-liquid extracting said organic phase (ii) with water or an aqueous solution of an alkali metal carbonate, whereby the uranium chloride values are extracted into a third aqueous phase.

17. The process as defined by claim 16, further comprising respectively separating said rare earth, thorium and uranium chloride values from said respective aqueous solutions thereof.

18. The process as defined by claim 4, said starting aqueous solution also including iron values, comprising (i) first liquid-liquid extracting said starting aqueous solution with said organic extractant, whereby the uranium and thorium chloride and iron values are extracted into an organic phase and the rare earth chloride values remain in a first aqueous phase; (ii) next washing the organic phase (i) with an aqueous nitric acid solution having a concentration ranging from 1 to 4 N, whereby the iron values are extracted into a second aqueous phase and the uranium and thorium chloride values remain in the washed organic phase; (iii) next liquid-liquid extracting said washed organic phase stripped of iron values with an aqueous nitric acid solution having a concentration of at most 0.1 M, whereby the thorium chloride values are extracted into a third aqueous phase and the uranium chloride values remain in organic phase; and (iv) thence liquid-liquid extracting said organic phase (iii) with an aqueous solution of an alkali metal carbonate, whereby the uranium chloride values are extracted into a fourth aqueous phase.

19. The process as defined by claim 18, further comprising respectively separating said rare earth, thorium and uranium chloride values from said respective aqueous solutions thereof.

20. The process as defined by claim 16, wherein the step (ii) the organic phase is liquid-liquid extracted with an aqueous solution of hydrochloric acid having a concentration of at most 0.1 M.

21. The process as defined by claim 16, wherein the step (iii) the organic phase is liquid-liquid extracted with an aqueous solution of an alkali metal carbonate having a concentration ranging from 0.5 to 2 M.

22. The process as defined by claim 16, further comprising recycling the organic phase (iii) to said step (i) and to said step (ii).

23. The process as defined by claim 4, comprising (i) first liquid-liquid extracting said starting aqueous solution with said organic extractant, whereby the uranium chloride values are extracted into an organic phase and the thorium and rare earth chloride values remain in a first aqueous phase; (ii) next liquid-liquid extracting the organic phase (i) with water or an aqueous solution of an alkali metal carbonate, whereby the uranium chloride values are extracted into a second aqueous phase; (iii) next liquid-liquid extracting said first aqueous phase with organic extractant, whereby the thorium chloride values are extracted into a second organic phase and the rare earth chloride values remain in a third aqueous phase; and (iv) thence liquid-liquid extracting said second organic phase with an aqueous hydrochloric acid solution, whereby the thorium chloride values are extracted into a third aqueous phase.

24. The process as defined by claim 23, further comprising respectively separating said rare earth, thorium and uranium chloride values from said respective aqueous solutions thereof.

25. The process as defined by claim 23, said starting aqueous solution also including iron values, further comprising, prior to the step (ii), washing the organic phase (i) with an aqueous nitric acid solution having a concentration ranging from 1 to 4 N, whereby the iron values are extracted into a fourth aqueous phase and the uranium chloride values remain in the washed organic phase; and, in said step (ii), liquid-liquid extracting the washed organic phase (i) with an aqueous solution of an alkali metal carbonate.

26. The process as defined by claim 25, further comprising respectively separating said rare earth, thorium and uranium chloride values from said respective aqueous solutions thereof.

27. The process as defined by claim 23, wherein the step (ii) the organic phase is liquid-liquid extracted with an aqueous solution of an alkali metal carbonate having a concentration ranging from 0.5 to 2 M.

28. The process as defined by claim 23, wherein the step (iv) the second organic phase is liquid-liquid extracted with an aqueous solution of hydrochloric acid and having a concentration of at most 0.1 M.

29. The process as defined by claim 23, further comprising recycling the organic phase (ii) to said step (i), and recycling the organic phase (iv) to said step (iii).

30. The process as defined by claim 16, said organic extractant comprising a solution of at least one neutral organophosphorus compound in an inert diluent.

31. The process as defined by claim 23, said organic extractant comprising a solution of at least one neutral organophosphorus compound in an inert diluent.

* * * * *